United States Patent
Lin et al.

(10) Patent No.: US 10,924,459 B2
(45) Date of Patent: Feb. 16, 2021

(54) LOCATION CONTROL AND ACCESS CONTROL OF EMAILS

(71) Applicant: Futurewei Technologies, Inc., Plano, TX (US)

(72) Inventors: Zongfang Lin, Santa Clara, CA (US); Chen Tian, Union City, CA (US); Reza Yazdani, Los Altos, CA (US); Yan Zeng, Hangzhou (CN); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 67 days.

(21) Appl. No.: 15/409,161

(22) Filed: Jan. 18, 2017

(65) Prior Publication Data

US 2018/0176190 A1 Jun. 21, 2018

Related U.S. Application Data

(60) Provisional application No. 62/435,490, filed on Dec. 16, 2016.

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0861* (2013.01); *H04L 9/14* (2013.01);
(Continued)

(58) Field of Classification Search
None
See application file for complete search history.

(56) References Cited

U.S. PATENT DOCUMENTS 6,154,543 A * 11/2000 Baltzley .................. G06F 21/00
380/255
8,954,605 B1 2/2015 Hecht
(Continued)

FOREIGN PATENT DOCUMENTS

CN 101217519 A 7/2008
CN 103188246 A 7/2013
(Continued)

OTHER PUBLICATIONS

Recall or Replace an Email Message that You Sent, Sep. 16, 2016, Microsoft, p. 6 (Year: 2016).*
(Continued)

*Primary Examiner* — Luu T Pham
*Assistant Examiner* — Edward X Long
(74) *Attorney, Agent, or Firm* — Conley Rose, P.C.

(57) ABSTRACT

A sender device includes a non-transitory memory storage comprising instructions and a location control policy, and a processor coupled to the memory. The processor executes the instructions to generate an email, generate a control mechanism for the email, wherein the control mechanism instructs a security server to implement the location control policy and wherein the location control policy affects a recipient device's use of the email, and integrate the control mechanism into the email to generate an integrated email. The sender device further includes a transmitter coupled to the processor and configured to transmit the integrated email to the security server for the security server to implement the control mechanism.

20 Claims, 11 Drawing Sheets

(51) Int. Cl.
*H04L 9/14* (2006.01)
*H04L 9/30* (2006.01)
*H04L 12/58* (2006.01)

(52) U.S. Cl.
CPC .............. *H04L 9/30* (2013.01); *H04L 51/18* (2013.01); *H04L 63/0227* (2013.01); *H04L 63/107* (2013.01); *H04L 63/20* (2013.01)

(56) References Cited

U.S. PATENT DOCUMENTS

| | | | |
|---|---|---|---|
| 9,014,343 B1 | 4/2015 | Peden et al. | |
| 2003/0046534 A1 | 3/2003 | Alldredge | |
| 2004/0181581 A1 | 9/2004 | Kosco | |
| 2005/0204008 A1 | 9/2005 | Shinbrood | |
| 2008/0162364 A1 | 7/2008 | Martin et al. | |
| 2009/0198997 A1 | 8/2009 | Yeap et al. | |
| 2010/0046757 A1 | 2/2010 | Dancer et al. | |
| 2012/0117209 A1* | 5/2012 | Sinha | G06F 21/88 709/221 |
| 2014/0109178 A1* | 4/2014 | Barton | G06F 9/45533 726/1 |
| 2015/0326703 A1* | 11/2015 | Kokubo | H04M 1/66 455/411 |
| 2016/0057156 A1* | 2/2016 | Lin | H04L 63/108 713/170 |
| 2016/0171238 A1 | 6/2016 | Sibillo | |
| 2016/0315967 A1 | 10/2016 | Trevathan et al. | |
| 2017/0041296 A1* | 2/2017 | Ford | H04L 63/0421 |
| 2017/0331777 A1 | 11/2017 | Brisebois et al. | |
| 2018/0034913 A1* | 2/2018 | Matthieu | H04L 61/3015 |

FOREIGN PATENT DOCUMENTS

| | | | | |
|---|---|---|---|---|
| CN | 104660491 A | * | 5/2015 | ............ H04L 12/58 |
| CN | 104660491 A | * | 5/2015 | |
| WO | 0008794 A2 | | 2/2000 | |
| WO | WO 00/08794 | * | 2/2000 | |
| WO | 2006000802 A2 | | 1/2006 | |

OTHER PUBLICATIONS

Recall or Replace an Email Message that You Sent, Sep. 16, 2016, Microsoft, p. 6 (Year: 2016) (Year: 2016).*
Jajodia et al., Encryption Policies for Regulating Access to Outsourced Data, 2010, ACM Transaction on Database Systems, vol. 35, No. 2, Article 12, pp. 12:1-12:45 (Year: 2010).*
Li et al., Security Evaluation of Email Encryption Using Random Noise Generated by LCG, 2005, Consortium for Computing Sciences in Colleges, JCSC 20, 4, pp. 294-301. (Year: 2005).*
Recall or Replace an Email Message That You Sent, Microsoft, Sep. 16, 2016, 7 pages.
Perez, S., et al., "Dmail Makes Your Gmail Messages Self-Destruct," TechCrunch, Retrieved from the Internet; URL: https://techcrunch.com/2015/07/23/dmail-makes-your-gmail-messages-self-destruct [retrieved on Sep. 16, 2016], Jul. 23, 2015, 8 pages.
RSA (cryptosystem), Wikipedia, Retrieved from the Internet; Sep. 16, 2016, 16 pages.
Lin, Z., et al., Patent Application entitled, "Temporal Control and Access Control of Emails," filed Dec. 16, 2016 as U.S. Appl. No. 62/435,486, 37 pages.
Lin, Z., et al., Patent Application entitled, "Temporal Control and Access Control of Emails," filed Jan. 11, 2017 as U.S. Appl. No. 15/403,925, 37 pages.
Machine Translation and Abstract of Chinese Publication No. CN101217519, Jul. 9, 2008, 6 pages.
Machine Translation and Abstract of Chinese Publication No. CN103188246, Jul. 3, 2013, 22 pages.
Machine Translation and Abstract of Chinese Publication No. CN104660491, May 27, 2015, 11 pages.
Foreign Communication From A Counterpart Application, PCT Application No. PCT/CN2017/114651, English Translation of International Search Report dated Feb. 24, 2018, 5 pages.
Foreign Communication From A Counterpart Application, PCT Application No. PCT/CN2017/114651, English Translation of Written Opinion dated Feb. 24, 2018, 4 pages.
Foreign Communication From A Counterpart Application, PCT Application No. PCT/CN2017/114652, English Translation of International Search Report dated Feb. 24, 2018, 5 pages.
Foreign Communication From A Counterpart Application, PCT Application No. PCT/CN2017/114652, English Translation of Written Opinion dated Feb. 24, 2018, 4 pages.
Office Action dated Dec. 12, 2019, 34 pages, U.S. Appl. No. 15/403,925, filed Jan. 11, 2017.

* cited by examiner

LOCATION CONTROL AND ACCESS CONTROL OF EMAILS

CROSS-REFERENCE TO RELATED APPLICATIONS

This application claims priority to U.S. provisional patent application No. 62/435,490 filed on Dec. 16, 2016 by Zongfang Lin, et al., and titled "Location Control and Access Control of Emails," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Remote communication has dominated in-person communication for some time. Remote communication includes landline calls, mobile calls, texting, faxing, video chatting, instant messaging, and email. Email remains the dominant medium for communicating secure documents. However, identity thieves and others seek to exploit vulnerabilities in emails. Email providers therefore seek to develop new ways to insure email security.

SUMMARY

It is desirable to have a reliable recall function, location control, and access control. According to various embodiments of the present disclosure, embodiments for location control and access control of emails are provided. Control mechanisms in the emails require implementation of the location control and the access control. Senders of the emails may recall, or cancel, emails at any time. A security server implementing the control mechanisms need not store the emails, thus reducing a storage load of the security server. The security server encrypts the emails using public keys and private keys, but keeps those keys separate. Thus, because the security server does not store the emails and because the security server separates the public key from the private key, a hack into the security server may yield encryption records of the emails and private keys associated with the emails, but not the emails themselves or the public keys associated with the emails. A hack into recipient devices may yield emails, but not the private key necessary to decrypt the emails. As a result, the control mechanisms provide a peace of mind to email senders. Though the disclosure focuses on emails, the disclosed embodiments may apply to other communication media as well.

In one embodiment, the disclosure includes an apparatus comprising: a processor configured to: generate an email; generate a control mechanism for the email, wherein the control mechanism instructs a security server to implement location control of a recipient device's use of the email; and integrate the control mechanism into the email; and a transmitter coupled to the processor and configured to transmit the email to the security server for the security server to implement the control mechanism. In some embodiments, the control mechanism comprises an allowed location field that requires that the recipient device be in an allowed location to open the email; the allowed location indicates a building, a legally-defined geographical area, or a geographical area defined by a shape; the control mechanism comprises a maximum openings number field that requires that the email be destroyed when the recipient device opens the email a number of times corresponding to a maximum openings number; the control mechanism comprises an invalidation number field that requires that the email be destroyed when the security server invalidates the recipient device for attempting to open the email a number of time corresponding to the invalidation number; the apparatus further comprises: a receiver coupled to the processor and configured to receive from the security server a receipt indicating that the security server successfully transmitted the email to the recipient device; the processor is further configured to generate a recall request requesting that the security server instruct the recipient device to destroy the email, and wherein the transmitter is further configured to transmit the recall request to the security server; the apparatus further comprises: a receiver coupled to the processor and configured to receive, from the security server and in response to the recall request, a destruction confirmation confirming that the recipient device destroyed the email.

In another embodiment, the disclosure includes an apparatus comprising: a receiver configured to receive from a sender device an email comprising a control mechanism, wherein the control mechanism instructs the apparatus to implement location control of a recipient device's use of the email; a processor coupled to the receiver and configured to: generate a public key; generate a private key; and encrypt, using the public key and the private key, the email to create an encrypted email; and a transmitter coupled to the processor and configured to transmit the encrypted email to the recipient device. In some embodiments, the processor is further configured to destroy the email and the encrypted email after the transmitting; the processor is further configured to destroy the public key after the transmitting; the receiver is further configured to receive a validation request from the recipient device, and wherein the processor is further configured to perform a validation of the recipient device in response to the validation request; the processor is further configured to generate a decryption instruction when the processor determines that the recipient device has complied with the control mechanism, and wherein the transmitter is further configured to transmit the decryption instruction to the recipient device; the processor is further configured to generate a destruction instruction when the processor determines that the recipient device has not complied with the control mechanism, and wherein the transmitter is further configured to transmit the destruction instruction to the recipient device; the receiver is further configured to receive a destruction confirmation from the recipient device in response to the destruction instruction; the destruction instruction comprises a destruction period, and wherein the apparatus is configured to disable an application in the recipient device responsible for opening the email when the apparatus does not receive a destruction confirmation from the recipient device by the destruction period.

In yet another embodiment, the disclosure includes a method implemented by an apparatus, the method comprising: receiving an encrypted email comprising a control mechanism, wherein the control mechanism controls location use or both location use and access use of the encrypted email by the apparatus; receiving a public key associated with the encrypted email; transmitting a validation request; receiving a decryption instruction when the apparatus complies with the control mechanism; and receiving a first destruction instruction when the apparatus does not comply with the control mechanism. In some embodiments, the method further comprises: decrypting the encrypted email to create a decrypted email in response to the decryption instruction; and displaying the decrypted email in response to the decryption instruction; the method further comprises: destroying the encrypted email and the public key in response to the first destruction instruction; generating a destruction confirmation in response to the first destruction instruction; and transmitting the destruction confirmation in response to the first destruction instruction; the method further comprises: receiving a second destruction instruction when a sender device requests recalling of the encrypted email; and destroying the encrypted email and the public key in response to the second destruction instruction.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
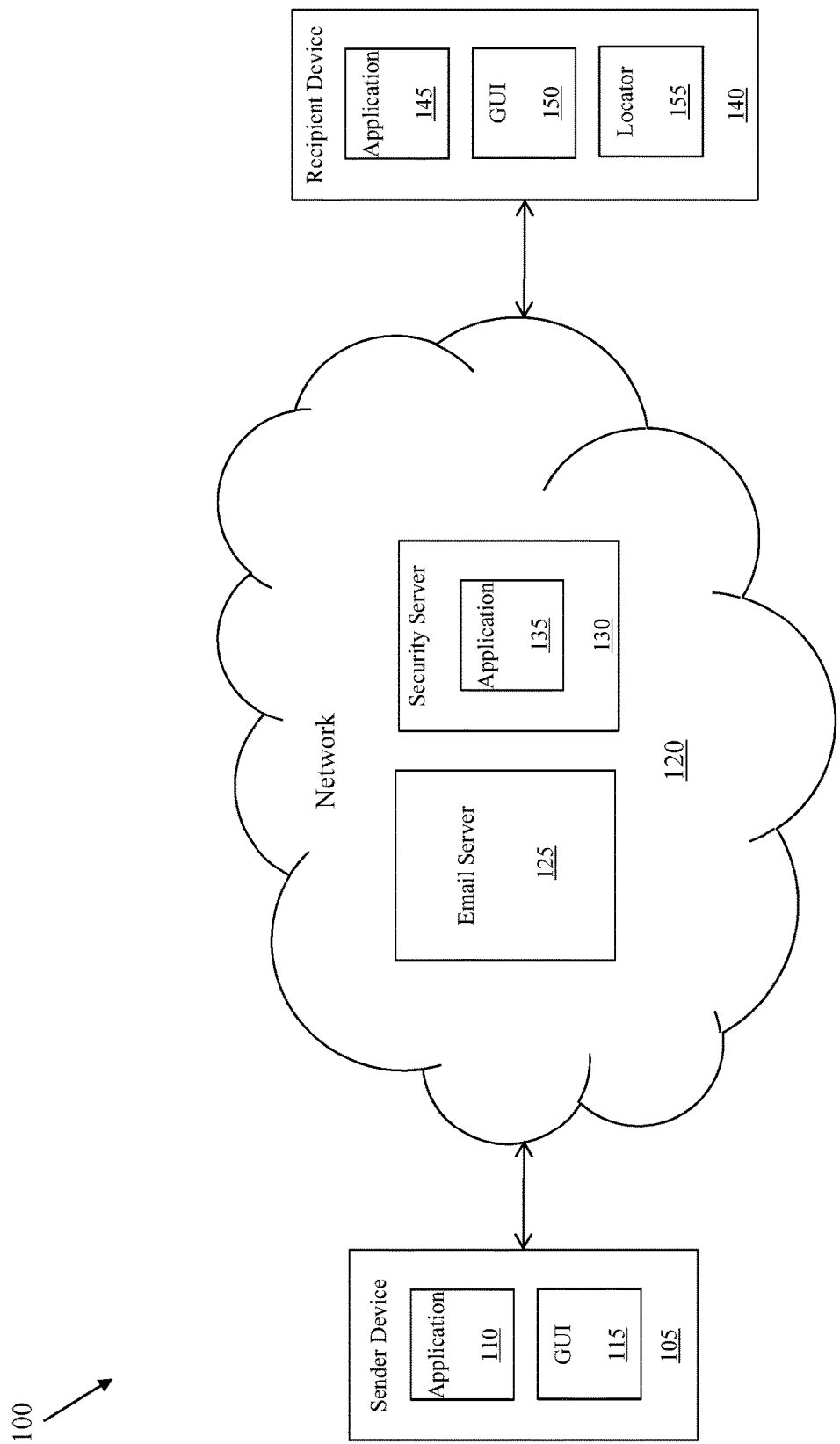
FIG. 1 is a schematic diagram of an email network according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms and initialisms apply:
ASIC: application-specific integrated circuit
CPU: central processing unit
DSP: digital signal processor
email: electronic mail
EO: electrical-to-optical
FPGA: field-programmable gate array
GPS: Global Positioning System
GUI: graphical user interface
ID: identifier
LAN: local area network
OE: optical-to-electrical
RAM: random-access memory
ROM: read-only memory
RSA: Rivest-Shamir-Adleman
RX: receiver
SRAM: static RAM
SSH: Secure Shell
TCAM: ternary content-addressable memory
TX: transmitter
UUID: universally unique ID
WAN: wide area network.

Emails often contain sensitive information. As a first example, a sender sends to a recipient an email with a copyrighted photograph, audio, or video. The recipient may not be able to legally view the copyrighted document outside a designated area, so the sender may desire to control the recipient's access to the email in that designated area. As a second example, a sender sends to a recipient an email with a medical record. The sender may desire to control where the recipient may view the medical record. For instance, if the recipient is a doctor, then the sender may not want the recipient to be able to view the medical record outside the doctor's office. As a third example, both a sender and a recipient are employees at the same company, and the sender sends to the recipient a work-related email containing a trade secret. The sender may not want the recipient to view the email outside of an employer's building. However, current email techniques do not provide sufficient security for such emails.

First, the sender may not send the email in a secure manner. Second, the sender may need to perform an explicit action to recall the email, and the recall function may be unsuccessful. The sender may desire to recall the email because the email may otherwise remain on the sender's device, in an email provider's server, or on a recipient's device so that another person may access the email at a later time, surreptitiously or otherwise. Third, the sender has no ability to implement location control or access control of the email. It is therefore desirable to have a reliable recall function, location control, and access control.

Disclosed herein are embodiments for location control and access control of emails. Control mechanisms in the emails require implementation of the location control and the access control. Senders of the emails may recall, or cancel, emails at any time. A security server implementing the control mechanisms need not store the emails, thus reducing a storage load of the security server. The security server encrypts the emails using public keys and private keys, but keeps those keys separate. Thus, because the security server does not store the emails and because the security server separates the public key from the private key, a hack into the security server may yield encryption records of the emails and private keys associated with the emails, but not the emails themselves or the public keys associated with the emails. A hack into recipient devices may yield emails, but not the private key necessary to decrypt the emails. As a result, the control mechanisms provide a peace of mind to email senders. Though the disclosure focuses on emails, the disclosed embodiments may apply to other communication media as well.

FIG. 1 is a schematic diagram of an email network 100 according to an embodiment of the disclosure. The email network 100 is described in U.S. patent application Ser. No. 15/403,925 filed on Jan. 11, 2017 by Futurewei Technologies, Inc. and titled "Temporal Control and Access Control of Emails," which is incorporated by reference. The email network 100 comprises a sender device 105, a network 120, an email server 125, a security server 130, and a recipient device 140. The email network 100 provides emailing with location control and access control.

The sender device 105 is a mobile phone, tablet computer, notebook, or other network-enabled device associated with a sender. The sender device 105 comprises an application 110 and a GUI 115, among other things. The application 110 generates, sends, receives, and processes emails. The GUI 115 provides an interface for a sender to interact with the application 110.

The network 120 enables communication between the sender device 105 and the recipient device 140. The network 120 is a LAN, a WAN, a mobile phone network, the Internet, or another suitable network. Alternatively, the network 120 comprises any combination of such networks.

The email server 125 hosts and services emails exchanged between the sender device 105 and the recipient device 140. The security server 130 comprises and executes an application 135 that provides security services for the emails exchanged between the sender device 105 and the recipient device 140. Multiple entities or the same entity control the email server 125 and the security server 130. The email server 125 and the security server 130 separate servers as shown or may be a single server.

The recipient device 140 is similar to the sender device 105 and is associated with a recipient. The recipient device 140 comprises an application 145 and a GUI 150, among other things, which are similar to the application 110 and the GUI 115, respectively. The recipient device 140 further comprises a locator 155. The applications 110, 135, 145 may be the same application or different applications. For instance, the application 135 may be a server-based version of the applications 110, 145. In addition, the applications 110, 135, 145 may be in communication with each other. For instance, the application 135 communicates with the applications 110, 145 in order to maintain control of the applications 110, 145. The locator 155 determines GPS coordinates or other data that indicate where the recipient device 140 is and provides that information to the application 145.

Figure 2:
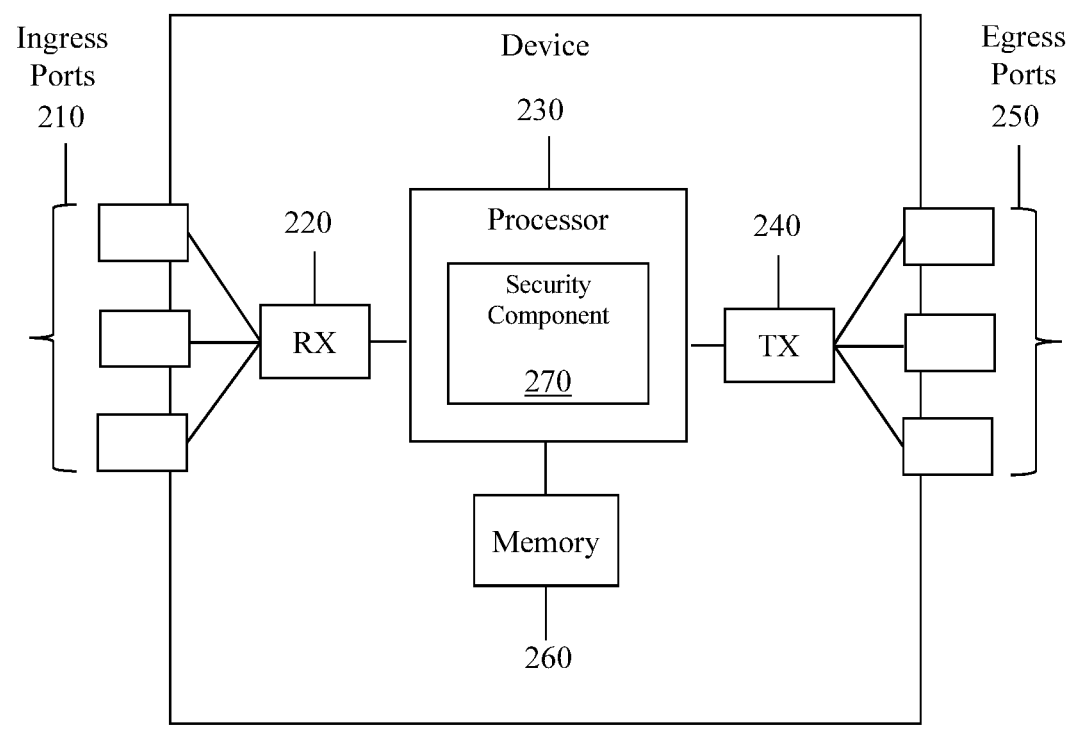
FIG. 2 is a schematic diagram of a device according to an embodiment of the disclosure.

FIG. 2 is a schematic diagram of a device 200 according to an embodiment of the disclosure. The device 200 may implement the sender device 105, the email server 125, the security server 130, and the recipient device 140. The device 200 comprises ingress ports 210 and an RX 220 for receiving data coupled to the ingress port or ports 210; a processor, logic unit, or CPU 230 to process the data and coupled to the RX 220; a TX 240 coupled to the processor 230; egress ports 250 for transmitting the data coupled to the TX 240; and a memory 260 for storing the data. The memory 260 is coupled to the processor 230. The device 200 may also comprise OE components and EO components coupled to the ingress ports 210, the RX 220, the TX 240, and the egress ports 250 for ingress or egress of optical or electrical signals.

The processor 230 is any suitable combination of hardware, middleware, firmware, and software. The processor 230 comprises any combination of one or more CPU chips, cores, FPGAs, ASICs, or DSPs. The processor 230 communicates with the ingress ports 210, RX 220, TX 240, egress ports 250, and memory 260. The processor 230 comprises a security component 270, which implements the disclosed embodiments. The inclusion of the security component 270 therefore provides a substantial improvement to the functionality of the device 200 and effects a transformation of the device 200 to a different state. Alternatively, the memory 260 stores the security component 270 as instructions, and the processor 230 executes those instructions.

The memory 260 comprises one or more disks, tape drives, or solid-state drives. The device 200 may use the memory 260 as an over-flow data storage device to store programs when the device 200 selects those programs for execution and to store instructions and data that the device 200 reads during execution of those programs. The memory 260 may be volatile or non-volatile and may be any combination of ROM, RAM, TCAM, or SRAM.

Figure 3:
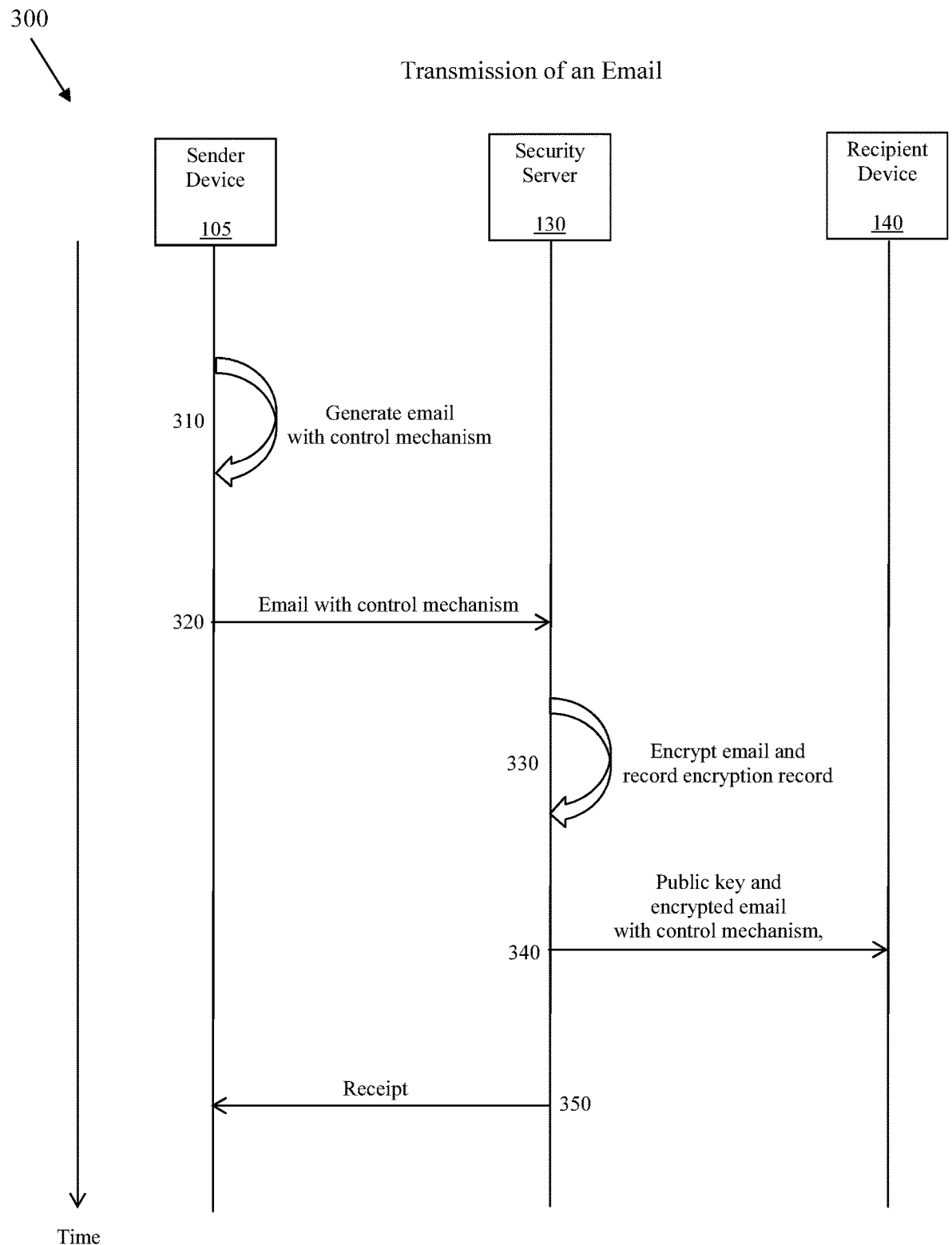
FIG. 3 is a message sequence diagram illustrating transmission of an email according to an embodiment of the disclosure.

FIG. 3 is a message sequence diagram 300 illustrating transmission of an email according to an embodiment of the disclosure. At step 310, the sender device 105 generates an email with a control mechanism. The sender device 105 may do so using the application 110 via the GUI 115. For instance, the GUI 115 generates a control mechanism icon that the sender may select while drafting an email. When the sender selects the control mechanism icon, the GUI 115 presents options for an allowed location field, a maximum openings number field, and an invalidation number in drop-down menus or another format.

The control mechanism comprises the fields listed in Table 1.

TABLE 1

Control Mechanism

| Field | Description |
|---|---|
| Allowed Location | Requires that the recipient device be in the allowed location to open the email |
| Maximum Openings Number | Requires that the email be destroyed when the recipient device 140 opens the email a number of times corresponding to the maximum openings number |
| Invalidation Number | A maximum number of invalidations that can occur |

The allowed location comprises GPS coordinates or other data that indicate a building such as a house, an office, or a hotel; a legally-defined geographical area such as an address, a zip code, a city, a state, or a country; a geographical area defined by a shape such as a circle; or other suitable location data. The maximum openings number may refer to when the recipient device 140 successfully opens the email. The invalidation number may require that the email be destroyed when the security server 130 invalidates the recipient device 140 a number of times corresponding to the invalidation number. The sender device 105 integrates the control mechanism into the email. The allowed location field may be referred to as location control of location use, and the maximum openings number and the invalidation number may together be referred to as access control of access use. Enforcement of the location control is referred to as a location control policy, and enforcement of the access control is referred to as an access control policy.

Though the message sequence diagram 300 shows that the sender device 105 generates the control mechanism, the security server 130 may partially generate or amend the control mechanism. As a first example, the sender device 105 generates the location field, and the security server 130 generates the maximum openings number and the invalidation number. As a second example, the sender device 105 generates all fields in the control mechanism, but the security server 130 reduces the maximum openings number or the invalidation number. The security server 130 may do so if it determines that the recipient device 140 has an out-of-date operating system, is otherwise a security threat, or for other reasons.

At step 320, the sender device 105 transmits to the security server 130 the email with the control mechanism. Alternatively, the sender device 105 transmits the email to the email server 125, which recognizes the control mechanism and forwards the email to the security server 130. The sender device 105 may do so using SSH or another suitable protocol. All communications among the sender device 105, the security server 130, and the recipient device 140 may use SSH.

At step 330, the security server 130 encrypts the email and records an encryption record. Specifically, first, the security server 130 generates a UUID and a random key pair using any suitable method. The key pair comprises a public key and a private key. Second, the security server encrypts the email with the key pair using, for instance, RSA encryption, which is described in "RSA (cryptosystem)," https://en.wikipedia.org/wiki/RSA_(cryptosystem), Sep. 16, 2016, which is incorporated by reference. Third, the security server 130 generates an encryption record based on the encryption. The encryption record comprises the fields listed in Table 2.

TABLE 2

| Encryption Record | |
|---|---|
| Field | Description |
| UUID | Uniquely identifies the encryption record |
| Sender ID | Identifies an email account of the sender |
| Recipient ID | Identifies an email account of the recipient |
| Allowed Location | Requires that the recipient device be in the allowed location to open the email |
| Maximum Openings Number | Requires that the email be destroyed when the recipient device 140 opens the email a number of times corresponding to the maximum openings number |
| Invalidation Number | Requires that the email be destroyed when the security server 130 invalidates the recipient device 140 for attempting to open the email a number of times corresponding to the invalidation number |
| Private Key | Validates the public key and, along with the public key, decrypts the email |
| Opening Counter | Indicates how many times the recipient device 140 has opened the email |
| Invalidation Counter | Indicates how many times the security server 130 invalidates the recipient device 140 |

The sender ID and the recipient ID are email addresses or ID numbers that uniquely identify email accounts of the sender and the recipient, respectively. There may be multiple recipient IDs if there are multiple recipient devices such as the recipient device 140. The allowed location field, maximum openings number field, and invalidation number field in the encryption record in Table 2 correspond to the control mechanism in Table 1. The security server 130 initializes the opening counter and the invalidation counter to 0. Fourth, in step 330, the security server 130 records the encryption record in an encryption record table, which may comprise encryption records associated with other emails.

At step 340, the security server 130 transmits the public key and the encrypted email to the recipient device 140, along with the control mechanism. The security server 130 destroys the encrypted email, thus saving storage space in the security server 130. Finally, at step 350, the security server 130 transmits a receipt to the sender device 105. The receipt indicates that the security server 130 successfully transmitted the encrypted email (with the control mechanism) to the recipient device 140. Though the message sequence diagram 300 shows secure communication between the security server 130 and the recipient device 140, communication between the sender device 105 and the security server 130 may likewise be secure in the same manner or in another suitable manner.

Figure 4:
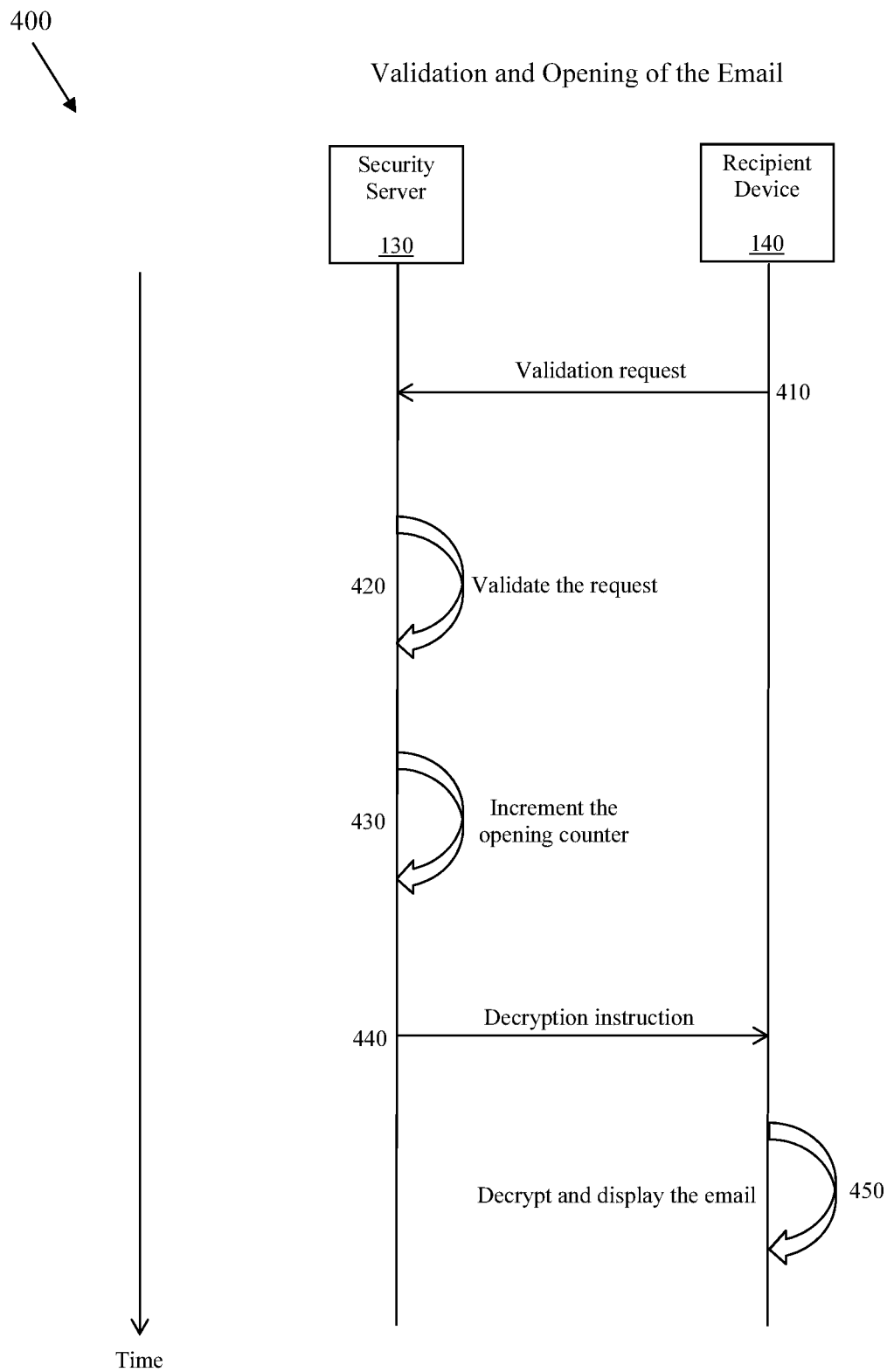
FIG. 4 is a message sequence diagram illustrating validation and opening of an email according to an embodiment of the disclosure.

FIG. 4 is a message sequence diagram 400 illustrating validation and opening of an encrypted email according to an embodiment of the disclosure. The message sequence diagram 400 may follow the message sequence diagram 300 of FIG. 3 in time. At step 410, the recipient device 140 transmits a validation request to the security server 130. The encrypted email may have just been received or may have been previously received by the recipient device 140, awaiting opening by the recipient. The recipient device 140 may transmit the validation request when a recipient desires to view the encrypted email and instructs the recipient device 140 to display the encrypted email. The validation request comprises the UUID, the recipient ID of the recipient device 140, the public key, and an access location. The access location comprises GPS coordinates or other data that indicate where the recipient device 140 is. The application 145 obtains that information from the locator 155 when generating the validation request. If the application 145 is unable to obtain that information from the locator 155, then the application 145 may not send the validation request.

At step 420, the security server 130 validates the recipient device 140 based on the validation request. Specifically, first, the security server 130 confirms that its encryption record table comprises an encryption record corresponding to the UUID in the validation request. Second, the security server 130 reads the encryption record corresponding to the UUID in the validation request. Third, the security server 130 confirms that the recipient ID in the validation request is in the encryption record. Fourth, the security server 130 confirms that the access location comports with the allowed location. For instance, if the allowed location comprises GPS coordinates that indicate a house, then the access location must likewise be the house. The security server 130 may allow a margin of error so that, for instance, the access location is a point in the house's yard. The security server 130 may use native software or third-party software to determine whether the access location comports with the allowed location. Fifth, the security server 130 confirms that the opening counter does not exceed the maximum openings number and that the invalidation counter does not exceed the invalidation number. Sixth, in step 420, the security server 130 validates the public key with the private key.

At step 430, the security server 130 increments the opening counter. At step 440, the security server 130 transmits a decryption instruction to the recipient device 140. The decryption instruction comprises an encrypted version of the private key and instructs the recipient device 140 that the recipient device 140 may decrypt the encrypted email.

Finally, at step 450, the recipient device 140 decrypts and displays the email. The recipient device 140 decrypts the encrypted email (generating a decrypted email) using the public key and the private key. After decrypting the email, the application 145 in the recipient device 140 destroys the private key. The application 145 may prevent the recipient device 140 from saving the decrypted email or taking a screenshot of the decrypted email. Thus, the recipient device 140 may be required to again obtain the private key from the security server 130 in order to decrypt and display the encrypted email. The public key and the private key are at the same location two times for a brief period, namely at the security server 130 when it first generates the public key and the private key and at the recipient device 140 when it receives the private key in the decryption instruction. The application 135 in the security server 130 or the application 145 in the recipient device 140 prevents the recipient device 140 from caching the private key. Specifically, if the recipient device 140 attempts to cache the private key, then the application 135 in the security server 130 disables the application 145 in the recipient device 140. The application 145 may also destroy the email.

Figure 5:
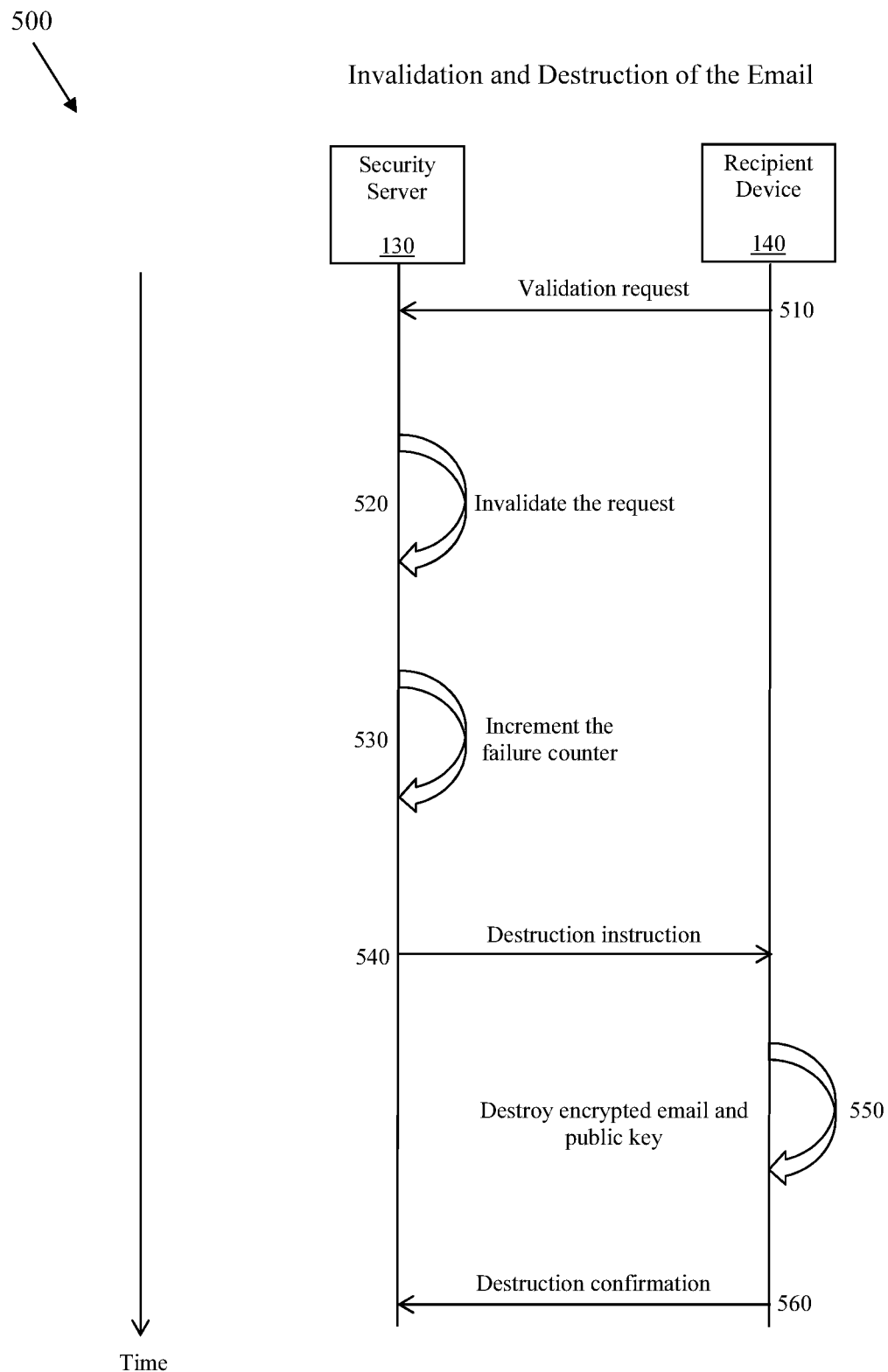
FIG. 5 is a message sequence diagram illustrating invalidation and destruction of an email according to an embodiment of the disclosure.

FIG. 5 is a message sequence diagram 500 illustrating invalidation and destruction of an email according to an embodiment of the disclosure. The message sequence diagram 500 may follow the message sequence diagram 300 of FIG. 3 or the message sequence diagram 400 of FIG. 4. At step 510, the recipient device 140 transmits a validation request to the security server 130. The recipient device 140 may do so when the recipient desires to view the email and instructs the recipient device 140 to display the email. The validation request comprises the UUID, the recipient ID of the recipient device 140, the public key, and the access location.

At step 520, the security server 130 invalidates the recipient device 140 based on the validation request. Specifically, the security server 130 invalidates the recipient device 140 if the UUID in the validation request is not in the encryption record table. Alternatively, the security server 130 confirms that the encryption record table comprises an encryption record corresponding to the UUID in the validation request and proceeds as follows. First, the security server 130 reads the encryption record corresponding to the UUID in the validation request. Second, the security server 130 invalidates the recipient device 140 if at least one of the following conditions is met: the recipient ID in the validation request is not in the encryption record, the access location does not comport with the allowed location, the opening counter meets or exceeds the maximum openings number, or the invalidation counter meets or exceeds the invalidation number.

At step 530, the security server 130 increments the invalidation counter. At step 540, the security server 130 transmits a destruction instruction to the recipient device 140. The destruction instruction instructs the application 145 on the recipient device 140 to destroy the email, destroy the private key, and transmit to the security server 130 a destruction confirmation upon doing so. The destruction instruction may comprise a predetermined destruction period by which the recipient device 140 is required to perform those actions. Email destruction may occur without an invalidation step or process, such as when the lifespan of the email expires. Alternatively, when the lifespan expires, the email is invalidated as part of (or to trigger) the destruction of the email. At step 550, the recipient device 140 destroys the email and the public key.

Finally, at step 560, the recipient device 140 transmits a destruction confirmation to the security server 130. The destruction confirmation confirms that the recipient device 140 has destroyed both the email and the private key. If the destruction instruction comprises the predetermined destruction period and if the security server 130 does not receive the destruction confirmation from the recipient device 140 by the predetermined destruction period, then in some embodiments the application 135 in the security server 130 disables the application 145 in the recipient device 140. Alternatively, the security server 130 first transmits one or more requests for destruction confirmation.

Figure 6:
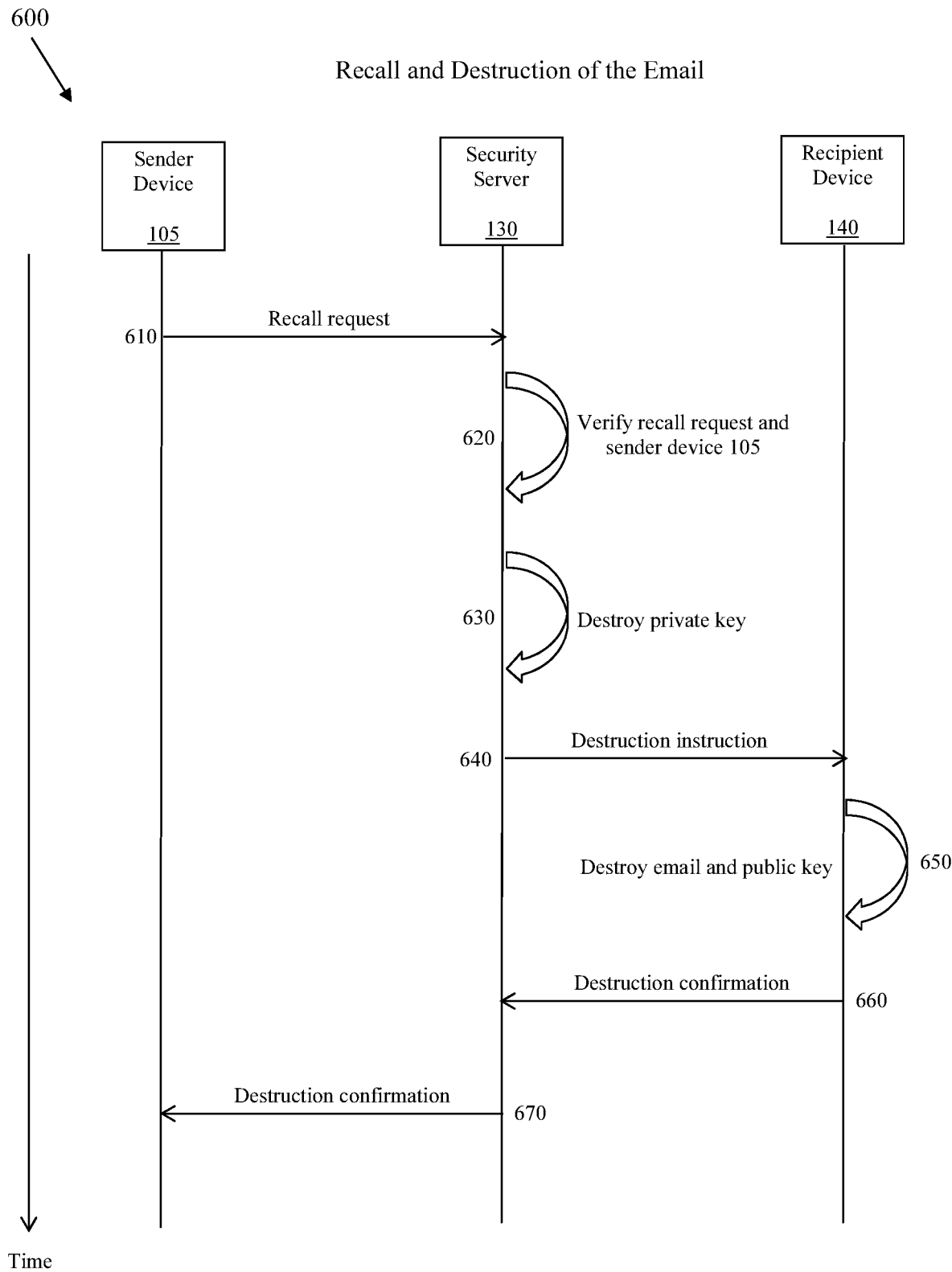
FIG. 6 is a message sequence diagram illustrating the recall and destruction of the email according to an embodiment of the disclosure.

FIG. 6 is a message sequence diagram 600 illustrating the recall and destruction of the email according to an embodiment of the disclosure. The message sequence diagram 600 may follow the message sequence diagram 300 of FIG. 3 or the message sequence diagram 400 of FIG. 4. At step 610, the sender device 105 transmits a recall request to the security server 130. The recall request comprises a UUID and a sender ID and requests that the security server 130 instruct the recipient device 140 to destroy the email.

At step 620, the security server 130 verifies the recall request and the sender device 105. Specifically, first, the security server 130 confirms that its encryption record table comprises an encryption record corresponding to the UUID in the recall request. Second, the security server 130 reads the encryption record corresponding to the UUID in the recall request. Third, the security server 130 confirms that the sender ID in the recall request is in the encryption record. At step 630, the security server 130 destroys the private key. In some embodiments, the destruction of the private key renders validation of the email impossible.

At step 640, the security server 130 transmits a destruction instruction to the recipient device 140. The destruction instruction instructs the recipient device 140 to destroy the email and transmit to the security server 130 a destruction confirmation upon doing so. The destruction instruction may comprise a predetermined destruction period by which the recipient device 140 is required to perform those actions. At step 650, the recipient device 140 destroys the email and the public key.

At step 660, the recipient device 140 transmits a destruction confirmation to the security server 130. The destruction confirmation confirms that the recipient device 140 destroyed the email. If the destruction instruction includes the predetermined destruction period and if the security server 130 does not receive the destruction confirmation from the recipient device 140 by the expiration of the predetermined destruction period, then the application 135 in the security server 130 disables the application 145 in the recipient device 140 in some embodiments. Alternatively, the security server 130 first transmits one or more requests for destruction confirmation. Finally, at step 670, the security server 130 forwards the destruction confirmation to the sender device 105.

Independently of the message sequence diagrams 300, 400, 500, 600, the security server 130 may transmit to the recipient device 140 a destruction instruction. For instance, the security server 130 may initially validate the access location of the recipient device 140, continuously monitor the access location of the recipient device 140, and transmit a destruction instruction to the recipient device 140 when the recipient device 140 moves beyond its validated access location. The destruction instruction instructs the recipient device 140 to destroy the email, destroy the private key, and transmit to the security server 130 a destruction confirmation upon doing so. The destruction instruction may comprise a predetermined destruction period by which the recipient device 140 is required to perform those actions.

The email can be destroyed by the recipient device 140. The email can be destroyed by the recipient device 140 when the number of failed access attempts exceeds the invalidation number. The email can be destroyed by the recipient device 140 when the maximum number of openings has been met or exceeded, i.e., a count of the number of openings of the email exceeds the maximum openings number. The email can be destroyed by the recipient device 140 when a validation process fails. The email can be destroyed by the recipient device 140 when the recipient decides to destroy the email, and the email still is valid and in existence.

The email can be destroyed by the security server 130. The email can be destroyed by the security server 130 when the number of failed access attempts exceeds the invalidation number. The email can be destroyed by the security server 130 when the maximum number of openings has been met or exceeded, i.e., a count of the number of openings of the email exceeds the maximum openings number. The email can be destroyed by the security server 130 when a validation process fails. The email can be destroyed by the security server 130 when the UUID received in a validation process is incorrect. The email can be destroyed by the security server 130 when the sender ID received in a validation process is incorrect. The email can be destroyed by the security server 130 when the recipient ID received in a validation process is incorrect.

As previously discussed, destruction of the encrypted e-mail at the recipient device 140 is accompanied by destruction of the public key by the application 145 on the recipient device 140. Further, destruction of the encrypted e-mail at the recipient device 140 is accompanied by destruction of the private key by the security server 130.

Figure 7A:
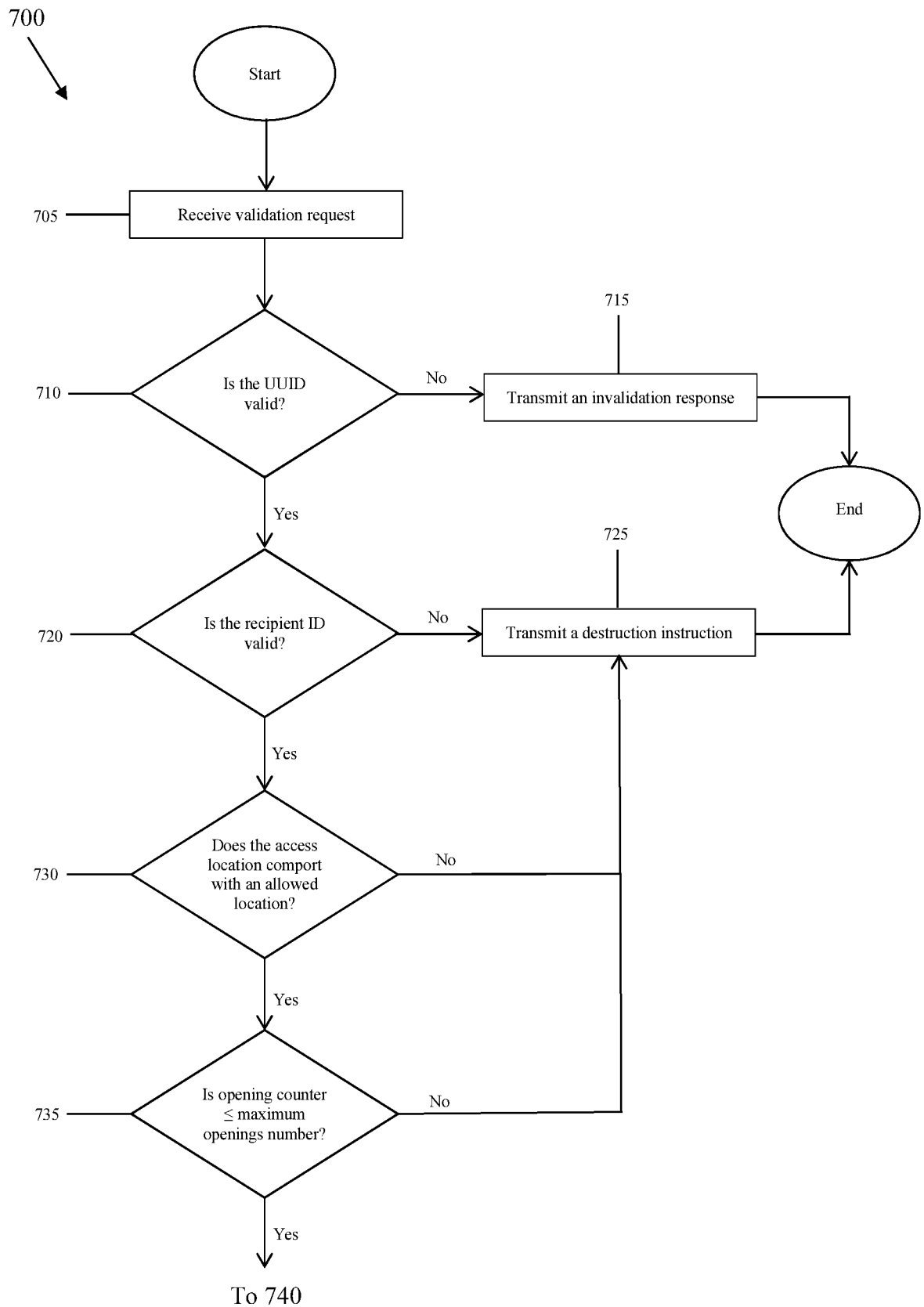
FIGS. 7A and 7B are flowcharts illustrating a method of email validation according to an embodiment of the disclosure.
Figure 7B:
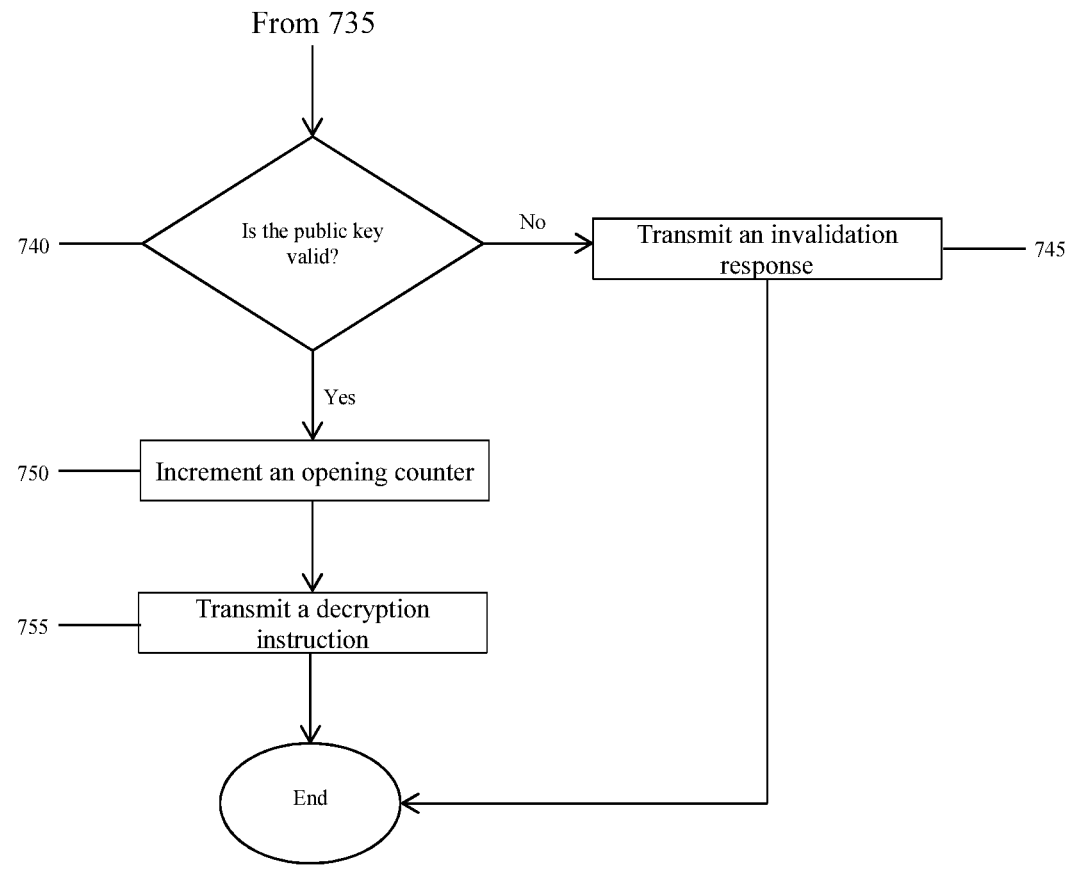

FIGS. 7A-7B are flowcharts illustrating a method 700 of email validation according to an embodiment of the disclosure. The security server 130 performs the method 700. Turning to FIG. 7A, at step 705, the security server 130 receives a validation request from the recipient device 140. The recipient device 140 has received (or previously received) an email according to any of the embodiments herein. The validation request comprises a UUID, a recipient ID of the recipient device 140, a public key, and an access location.

At decision diamond 710, the security server 130 determines whether the UUID is valid. Specifically, the security server 130 confirms that its encryption record table comprises an encryption record corresponding to the UUID in the validation request. If the result of decision diamond 710 is no, then the method 700 proceeds to step 715. At step 715, the security server 130 transmits an invalidation response to the recipient device 140. In addition, the security server 130 increments the invalidation counter to record the occurrence of a failed validation attempt. If the result of decision diamond 710 is yes, then the method 700 proceeds to decision diamond 720.

At decision diamond 720, the security server 130 determines whether the recipient ID is valid. Specifically, the security server 130 confirms that the recipient ID in the validation request is in the encryption record corresponding to the UUID. If the result of decision diamond 720 is no, then the method 700 proceeds to step 725. At step 725, the security server 130 transmits a destruction instruction to the recipient device 140. The destruction instruction instructs the recipient device 140 to destroy the email, destroy the private key, and transmit to the security server 130 a destruction confirmation upon doing so. The destruction instruction may comprise a predetermined destruction period by which the recipient device 140 is required to perform those actions, in some embodiments. Alternatively, if the result of the decision diamond 720 is no, then the method 700 proceeds to step 715. If the result of decision diamond 720 is no, then the method 700 proceeds to decision diamond 730.

At decision diamond 730, the security server 130 determines whether the access location comports with an allowed location. If the result of decision diamond 730 is no, then the method 700 proceeds to step 725, which is described above. If the result of decision diamond 730 is yes, then the method 700 proceeds to decision diamond 735.

At decision diamond 735, the security server 130 determines whether an opening counter is less than or equal to a maximum openings number in the encryption record. If the result of decision diamond 735 is no, then the method 700 proceeds to step 725, which is described above. If the result of decision diamond 735 is yes, then the method 700 proceeds to decision diamond 740 in FIG. 7B.

Turning to FIG. 7B, at decision diamond 740, the security server 130 determines whether the public key is valid. If the result of decision diamond 740 is no, then the method 700 proceeds to step 745. At step 745, the security server 130 transmits an invalidation response to the recipient device 140. In addition, the security server 130 increments the invalidation counter. If the result of decision diamond 740 is yes, then the method 700 proceeds to step 750.

At step 750, the security server 130 increments an opening counter in the encryption record. Finally, at step 755, the security server 130 transmits a decryption instruction to the recipient device 140. The decryption instruction comprises an encrypted version of the private key and instructs the recipient device 140 that it may decrypt the email.

Figure 8:
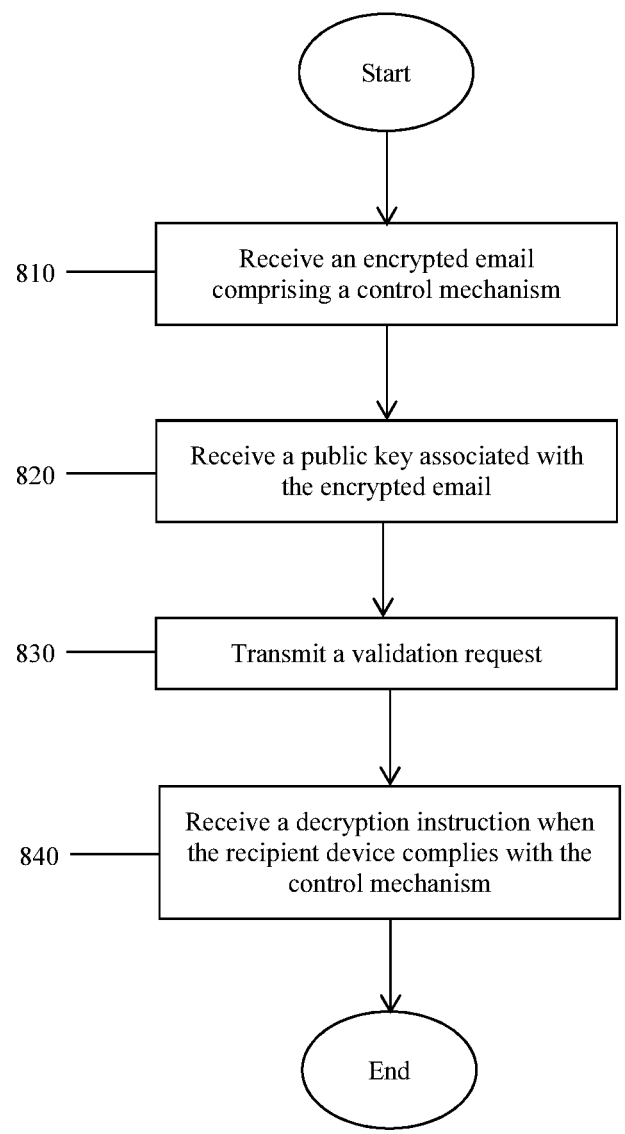
FIG. 8 is a flowchart illustrating a method of implementing an email control mechanism according to an embodiment of the disclosure.

FIG. 8 is a flowchart illustrating a method 800 of implementing an email control mechanism according to an embodiment of the disclosure. The recipient device 140 implements the method 800. At step 810, an encrypted email comprising a control mechanism is received. The control mechanism implements a temporary control policy that affects location use or both location use and access use of the encrypted email by the recipient device 140. At step 820, a public key associated with the encrypted email is received. At step 830, a validation request is transmitted. For instance, the recipient device 140 transmits the validation request to the security server 130. The validation request comprises a UUID, a recipient ID of the recipient device 140, a public key, and an access location. Finally, at step 840, a decryption instruction comprising a private key is received when the apparatus complies with the control mechanism.

Figure 9:
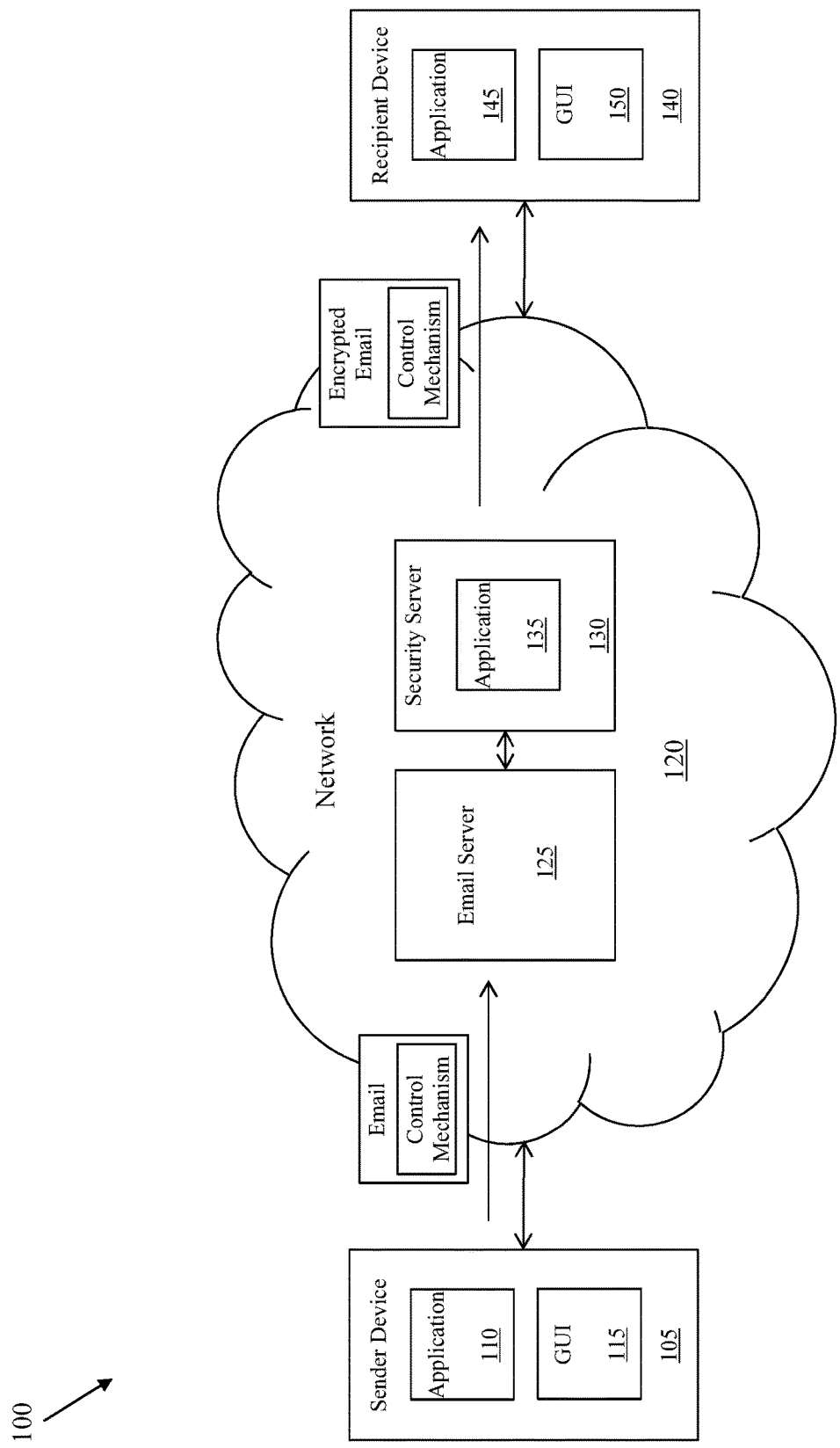
FIG. 9 is an example embodiment where the application in the sender device creates the email, including the control mechanism.

FIG. 9 is an example embodiment where the application 110 in the sender device 105 creates the email, including the control mechanism. In such embodiments, the security server 130 (and the application 135) receives (or intercepts) the email from the sender device 105. The application 135 can extract information from the control mechanism of the email, such as the open date, the maximum number of openings, and the invalidation number, for example. The security server 130 generates a public key and a private key for encryption of the email. In addition, the security server 130 can add items to the control mechanism, such as the public key generated by the security server 130. Further, the security server 130 encrypts the email and replaces the received email contents with the encrypted email. In addition, the security server 130 stores the private key for future use in decrypting the email.

Figure 10:
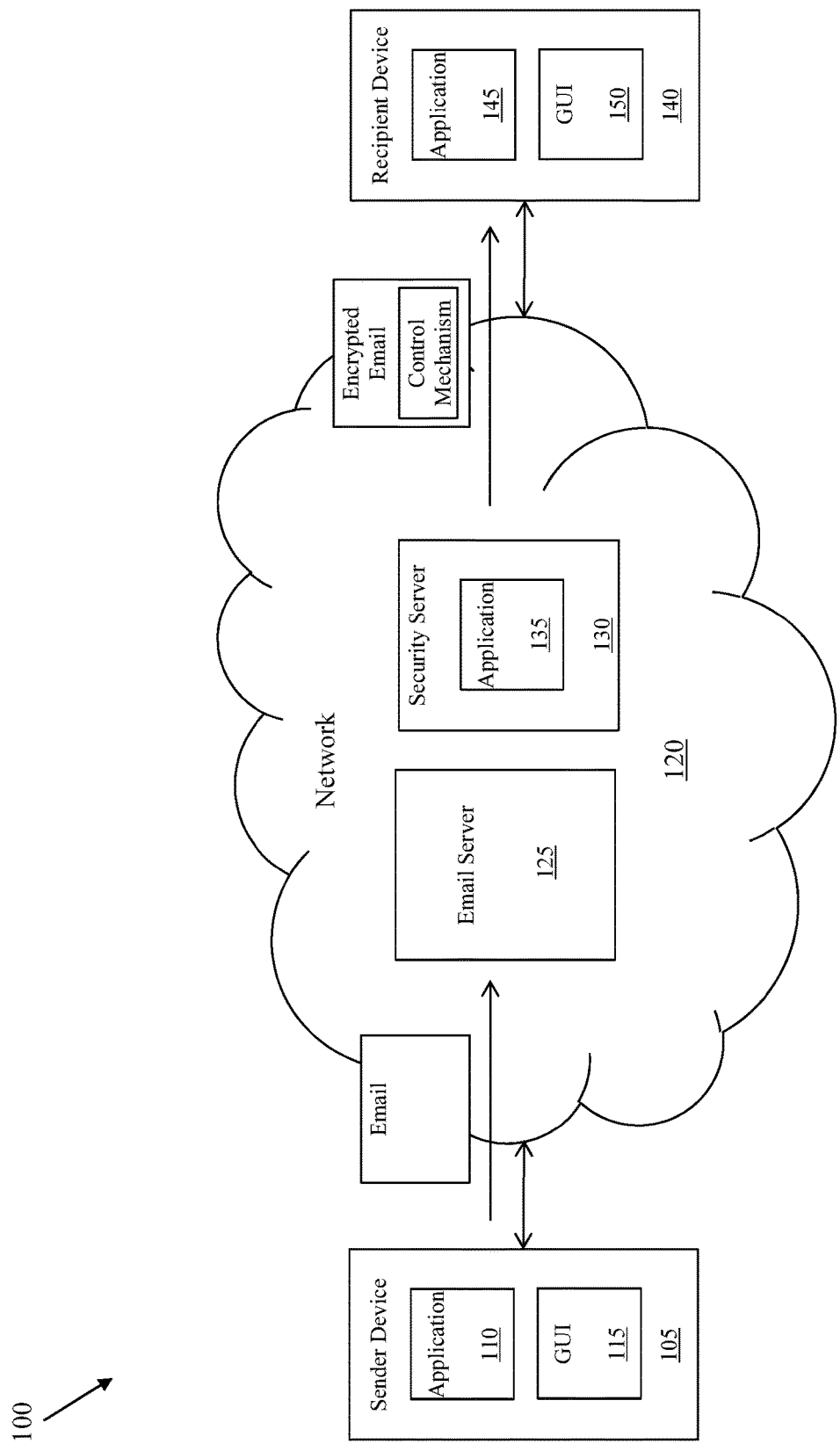
FIG. 10 shows an alternative example embodiment where the sender device creates the email and the security server modifies the email to include the control mechanism.

FIG. 10 shows an alternative example embodiment where the sender device 105 creates the email and the security server 130 modifies the email to include the control mechanism. In this example embodiment, as the application 135 of the security server 130 modifies the received email before relaying the email on toward the intended recipient. The security server 130 generates the public and private encryption keys, encrypts the email, and replaces the original email contents with the encrypted email and the public key. The security server 130 then transmits the email and the control mechanism to the recipient device 140.

In an example embodiment, an apparatus comprises a processing element configured to generate an email, generate a control mechanism for the email (wherein the control mechanism instructs a security server to implement location control of a recipient device's use of the email) and integrate the control mechanism into the email. A transmitting element coupled to the processing element is configured to transmit the email to the security server for the security server to implement the control mechanism.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A sender device comprising:
a processor configured to:
generate an email;
generate a control mechanism for the email, the control mechanism instructs a security server to implement a location control policy that affects a recipient device's use of the email, the control mechanism comprises an invalidation number field, an allowed location field, and a maximum openings number field, the invalidation number field requires that the email be destroyed when an invalidation counter exceeds an invalidation number, the invalidation counter is based on a recipient identifier (ID) and increments when a universally unique identifier (UUID) is not in an encryption record table, the UUID uniquely identifies an encryption record of the email, and the recipient ID uniquely identifies an email account of a recipient of the recipient device;
integrate the control mechanism into the email to generate an integrated email; and
generate a recall request requesting that the security server instruct the recipient device to destroy the email, wherein the recall request comprises the UUID or a sender ID;
a transmitter coupled to the processor and configured to transmit the integrated email to the security server for the security server to implement the control mechanism; and
a receiver coupled to the processor and configured to receive, from the security server and in response to the recall request, a destruction confirmation confirming that the recipient device destroyed the email.

2. The sender device of claim 1, wherein the allowed location field requires that the recipient device be in an allowed location to open the email.

3. The sender device of claim 2, wherein the allowed location indicates a building, a legally-defined geographical area, or a geographical area defined by a shape.

4. The sender device of claim 1, wherein the maximum openings number field requires that the email be destroyed when the recipient device opens the email a number of times corresponding to a maximum openings number.

5. The sender device of claim 1, wherein the invalidation counter is further based on a public key.

6. The sender device of claim 1, wherein the receiver is further configured to receive from the security server a receipt indicating that the security server successfully transmitted the email.

7. The sender device of claim 1, wherein the recall request comprises the UUID and the sender ID.

8. A security server comprising:
a receiver configured to receive an email comprising a control mechanism, the
control mechanism instructs the security server to implement a location control policy that affects a recipient device's use of the email, the control mechanism comprises an invalidation number field requiring that the email be destroyed when an invalidation counter exceeds an invalidation number, the invalidation counter is based on a recipient identifier (ID) and increments when a universally unique identifier (UUID) is not in an encryption record table, the UUID uniquely identifies an encryption record of the email, and the recipient ID uniquely identifies an email account of a recipient of the recipient device;
a processor coupled to the receiver and configured to:
generate the encryption record;
generate a public key;
generate a private key;
encrypt the email using the public key and the private key to create an encrypted email; and
generate a destruction instruction in response to the recipient device not complying with the control mechanism;
a memory coupled to the processor and configured to store the encryption record; and
a transmitter coupled to the processor and configured to:
transmit the encrypted email and the public key to the recipient device: and
transmit the destruction instruction to the recipient device,
wherein the receiver is further configured to receive a desruction confirmation from the recipient device in response to the destruction instruction.

9. The security server of claim 8, wherein the processor is further configured to destroy the email and the encrypted email after transmitting the encrypted email.

10. The security server of claim 8, wherein the processor is further configured to destroy the public key after transmitting the public key.

11. The security server of claim 8, wherein the receiver is further configured to receive a validation request from the recipient device, and wherein the processor is further configured to perform a validation of the recipient device in response to the validation request.

12. The security server of claim 11, wherein the processor is further configured to generate a decryption instruction when the processor determines that the recipient device has complied with the control mechanism.

13. The security server of claim 8, wherein the destruction instruction includes a predetermined destruction period.

14. A method implemented by a recipient device, the method comprising:
   receiving an encrypted email comprising a control mechanism, the control mechanism implements a location control policy that affects location use or both location use and access use of the encrypted email by the recipient device, the control mechanism comprises an invalidation number field requiring that the encrypted email be destroyed when an invalidation counter exceeds an invalidation number, the invalidation counter is based on a recipient identifier (ID) and increments when a universally unique identifier (UUID) is not in an encryption record table, the UUID uniquely identifies an encryption record of the encrypted email, and the recipient ID uniquely identifies an email account of a recipient of the recipient device;
   receiving a public key associated with the encrypted email;
   transmitting a validation request comprising the recipient ID, the UUID, and an access location;
   receiving a decryption instruction comprising a private key in response to the recipient device complying with the control mechanism;
   receiving a first destruction instruction in response to the recipient device not complying with the control mechanism;
   destroying the encrypted email and the public key in response to the first destruction instruction;
   generating a destruction confirmation in response to the first destruction instruction; and
   transmitting the destruction confirmation in response to the first destruction instruction.

15. The method of claim 14, further comprising decrypting the encrypted email to create a decrypted email in response to the decryption instruction.

16. The method of claim 14, further comprising receiving a second destruction instruction in response to a sender device requesting a recall of the encrypted email.

17. The method of claim 16, further comprising destroying the encrypted email and the public key in response to the second destruction instruction.

18. The sender device of claim 7, wherein the transmitter is further configured to transmit the recall request to the security server.

19. The security server of claim 12, wherein the transmitter is further configured to transmit the decryption instruction and the private key to the recipient device.

20. The security server of claim 13, wherein the security server is configured to disable an application in the recipient device responsible for opening the email when the security server does not receive the destruction confirmation from the recipient device by the predetermined destruction period.

* * * * *